United States Patent [19]

Shimura et al.

[11] Patent Number: 5,267,153
[45] Date of Patent: Nov. 30, 1993

[54] METHOD AND APPARATUS FOR STORING IMAGE SIGNALS

[75] Inventors: Kazuo Shimura; Tsutomu Kimura; Masaaki Ohtsuka, all of Kanagawa, Japan

[73] Assignee: Fuji Photo Film Co., Ltd., Kanagawa, Japan

[21] Appl. No.: 684,072

[22] Filed: Apr. 12, 1991

[30] Foreign Application Priority Data

Apr. 16, 1990 [JP] Japan .................................. 2-99986
Apr. 16, 1990 [JP] Japan .................................. 2-99987

[51] Int. Cl.$^5$ .......................... G06F 15/00; G01T 1/11; H04N 1/46; H04N 7/12
[52] U.S. Cl. ............................... 364/413.13; 250/337; 358/500; 358/138
[58] Field of Search ........................... 364/414, 413.13; 358/75, 77, 448, 456, 426, 455, 443

[56] References Cited

U.S. PATENT DOCUMENTS 4,602,333  7/1986  Komori .............................. 364/414
5,086,392  2/1992  Nakajima ....................... 364/413.13

Primary Examiner—Roy N. Envall, Jr.
Assistant Examiner—Khai Tran
Attorney, Agent, or Firm—Sughrue, Mion, Zinn, Macpeak & Seas

[57] ABSTRACT

In image signal storing method and apparatus, a continuous tone image signal representing a continuous tone image and a binary image signal representing a binary image, which carries information giving specifics about the continuous tone image, are obtained. A redundancy imparting process is carried out on the binary image signal in accordance with irreversible signal compression processing such that the information represented by the binary image signal may not be reduced when the irreversible signal compression processing is carried out. Thereafter part of the continuous tone image signal, which part corresponds to part of the region in the continuous tone image, is replaced by the binary image signal, which has been obtained from the redundancy imparting process. The irreversible signal compression processing is then carried out on an image signal, which has been obtained from the replacement. An image signal, which has been obtained from the irreversible signal compression processing, is then stored.

16 Claims, 6 Drawing Sheets

FIG. 2A

|   |   |   |   |   |   |
|---|---|---|---|---|---|
| $X_{11}$ | $X_{12}$ | $X_{13}$ | – | – | – |
| $X_{21}$ | $X_{22}$ | $X_{23}$ | – | – |   |
| $X_{31}$ | $X_{32}$ | $X_{33}$ | – | – |   |
| $X_{41}$ | $X_{42}$ | $X_{43}$ | – | – |   |
| – | – | – |   |   |   |
| – | – |   |   |   |   |

FIG. 2B

|   |   |   |   |   |   |
|---|---|---|---|---|---|
| a | a | b | b | c | c |
| a | a | b | b | c | c |
| d | d | e | e | f | f |
| d | d | e | e | f | f |

FIG. 2C

| $X_{11}$ | $a_{11}$ | $X_{12}$ | $a_{12}$ | $X_{13}$ | $a_{13}$ | $X_{14}$ |
|---|---|---|---|---|---|---|
| $b_{11}$ | $c_{11}$ | $b_{12}$ | $c_{12}$ | $b_{13}$ | $c_{13}$ | $b_{14}$ |
| $X_{21}$ | $a_{21}$ | $X_{22}$ | $a_{22}$ | $X_{23}$ | $a_{23}$ | $X_{24}$ |
| $b_{21}$ | $c_{21}$ | $b_{22}$ | $c_{22}$ | $b_{23}$ | $c_{23}$ | $b_{24}$ |
| $X_{31}$ | $a_{31}$ | $X_{32}$ | $a_{32}$ | $X_{33}$ | $a_{33}$ | $X_{34}$ |

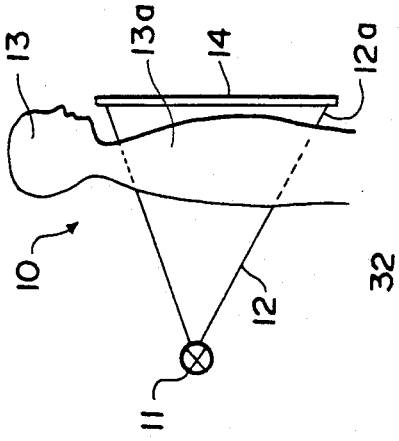
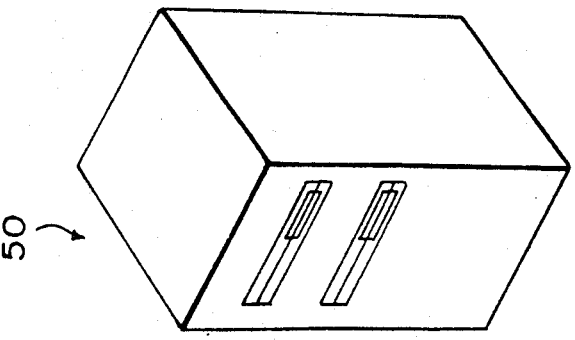
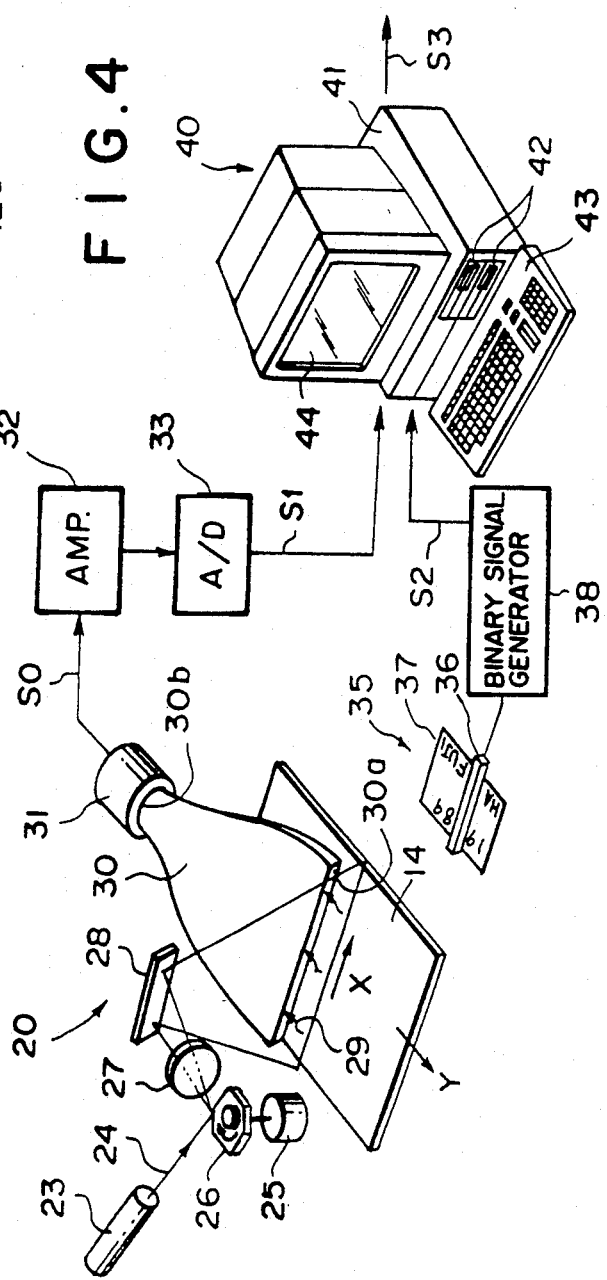

METHOD AND APPARATUS FOR STORING IMAGE SIGNALS

BACKGROUND OF THE INVENTION

1. Field of the Invention

This invention relates to a method for storing image signals, and an apparatus for carrying out the method.

2. Description of the Prior Art

Image filing apparatuses for filing image signals, which represent images, have heretofore been used in various fields. For example, at medical facilities, such as hospitals, many kinds of medical images are utilized for medical treatment or research. Most of the medical images are radiation images. In recent years, many computed tomography (CT) images, magnetic resonance (MR) images, and the like, are also utilized.

The medical images should be stored to permit investigation of changes in diseases or injuries of patients, and it is legally stipulated that the medical images must be stored for a predetermined period. Therefore, in hospitals, or the like, the number of stored medical images increases daily. The medical image have heretofore been stored in the form of hard copies. However, storage as hard copies requires a large storage space and burdensome operations for control and retrieval of the medical images in hospitals, or the like.

Accordingly, in recent years, an image filing apparatus has been proposed in which images, such as medical images, are retrievably stored (i.e. filed) as image signals on a storage medium. In cases where the medical images are filed in this manner on the storage medium, the space requirement and the burden of image storage can be reduced, and the images can be retrieved easily and quickly.

In an image signal representing an image, such as a medical image, in order for continuous tones to be expressed, many bits are assigned to each of the image signal components of the image signal representing the picture elements in the image. Therefore, the amount of the image signal representing each image is very large. Accordingly, usually, various reversible signal compression processing methods or various irreversible signal compression processing methods are carried out on image signals, and the amounts of the image signals are thereby decreased. Image signals, which have thus been compressed, are then stored on a storage medium.

With the reversible signal compression processing methods, an original image signal is compressed such that the original image signal can be restored completely from the compressed image signal. In such cases, an image can be reproduced from the restored image signal, which image has the same level of image quality as the original image. However, the amount of the original image signal cannot be decreased markedly, and the amount of the compressed image signal is comparatively large. Therefore, with the reversible signal compression processing methods, only a comparatively small number of images can be stored in the form of image signals on a storage medium having a predetermined storage capacity. Specifically, the reversible signal compression processing methods are not advantageous from the point of view of the image filing efficiency.

On the other hand, with the irreversible signal compression processing methods, an original image signal is compressed such that the original image signal cannot be restored completely from the compressed image signal. In such cases, a reproduced image is obtained from the restored image signal, which image has a lower level of image quality than the original image. However, the amount of the original image signal can be decreased markedly.

Therefore, in general, in image filing apparatuses for storing a large number of images in the form of image signals, which images should be stored for a long period, irreversible signal compression processing is carried out on original image signals, and the original image signals are thereby compressed to such extents that image signals representing images having acceptable levels of image quality can be restored from the compressed image signals. The compressed image signals, which have been obtained from the irreversible signal compression processing, are stored in the image filing apparatuses. In such image filing apparatuses, ordinarily, when an image signal is stored, a code signal is also stored simultaneously, which gives specifics about the image signal, such as the name of the image represented by the image signal and the date on which the image was recorded. The code signal serves as an index when the image signal, which has been stored, is read.

The image filing apparatus described above is provided with a function for carrying out irreversible signal compression processing on an image signal, and a function for storing a compressed image signal, which has been obtained from the irreversible signal compression processing, on a storage medium. The image filing apparatus is also provided with a function for storing a code signal, which gives specifics about an image signal, on a storage medium, and a function for reading a compressed image signal and a code signal, which have been stored.

Nowadays it is desired that not only can the information giving specifics about image signals be stored in the form of code signals, but information about handwritten characters, or the like, can also be stored as subsidiary signals giving specifics about the image signals such that it may be clear which subsidiary signals correspond to which image signals. In order for such a demand to be satisfied, it is thought that some of image filing apparatuses, which have heretofore been used, may be renewed such that information about handwritten characters, or the like, can also be stored. However, in order for some of image filing apparatuses, which have heretofore been used, to be renewed, considerable expenses will be required. Additionally, such new image filing apparatuses become incompatible with the image filing apparatuses, which have heretofore been used and in which only signals including no information about handwritten characters, or the like, are stored. Therefore, the system comprising the old and new image filing apparatuses becomes very inconvenient to operate.

SUMMARY OF THE INVENTION

The primary object of the present invention is to provide an image signal storing method, wherein a signal fed into an image filing apparatus, which has heretofore been used, is designed in a specific manner such that information about handwritten characters, or the like, can also be stored in the image filing apparatus, which has heretofore been used.

Another object of the present invention is to provide an apparatus for carrying out the image signal storing method.

The present invention provides a first image signal storing method, which comprises the steps of:

i) obtaining a continuous tone image signal representing a continuous tone image, in which continuous tones are expressed, and a binary image signal representing a binary image, which carries information giving specifics about said continuous tone image, ii) replacing part of said continuous tone image signal, which part corresponds to part of the region in said continuous tone image, by said binary image signal, iii) carrying out irreversible signal compression processing on an image signal, which has been obtained from said replacement, and iv) storing an image signal, which has been obtained from said irreversible signal compression processing, wherein a redundancy imparting process is carried out on said binary image signal in accordance with said irreversible signal compression processing such that the information represented by said binary image signal may not be reduced when said irreversible signal compression processing is carried out, and thereafter said part of said continuous tone image signal, which part corresponds to said part of the region in said continuous tone image, is replaced by the binary image signal, which has been obtained from said redundancy imparting process.

The present invention also provides a first image signal storing apparatus, which comprises:

i) a signal replacing means for:

a) obtaining a continuous tone image signal representing a continuous tone image, in which continuous tones are expressed, and a binary image signal representing a binary image, which carries information giving specifics about said continuous tone image, and b) replacing part of said continuous tone image signal, which part corresponds to part of the region in said continuous tone image, by said binary image signal, ii) a signal compression processing means for carrying out irreversible signal compression processing on an image signal, which has been obtained from said replacement, iii) a storage means for storing a plurality of image signals, and iv) a signal writing means for writing an image signal, which has been obtained from said irreversible signal compression processing, into said storage means, wherein a redundancy imparting means is provided, which carries out a redundancy imparting process on said binary image signal in accordance with said irreversible signal compression processing such that the information represented by said binary image signal may not be reduced when said irreversible signal compression processing is carried out, and said signal replacing means replaces said part of said continuous tone image signal, which part corresponds to said part of the region in said continuous tone image, by the binary image signal, which has been obtained from said redundancy imparting process.

In most of medical images, or the like, all of different parts of each image are not equally important for a diagnosis of an illness, or the like. Usually, only the middle part of an image is important, and surrounding image parts, are not much important. Also, information about characters, or the like, need not be expressed with continuous tones, but may be expressed with white and black. The amount of a binary signal representing white and black is comparatively small.

Therefore, with the first image signal storing method and apparatus in accordance with the present invention, part of the continuous tone image signal, which part corresponds to part of the region in the continuous tone image, such as a medical image, is replaced by the binary image signal representing the binary image of characters, or the like.

However, if part of the continuous tone image signal, which part corresponds to part of the region in the continuous tone image, is merely replaced by the binary image signal, there will be the risk that, when the irreversible signal compression processing is then carried out, part of the information represented by the binary image signal is lost. Therefore, with the first image signal storing method and apparatus in accordance with the present invention, a redundancy is imparted to the binary image signal in accordance with the irreversible signal compression processing such that the information represented by the binary image signal may not be lost when the irreversible signal compression processing is carried out. Thereafter, part of the continuous tone image signal, which part corresponds to part of the region in the continuous tone image, is replaced by the binary image signal, which has thus been imparted with the redundancy.

Thereafter, the irreversible signal compression processing is carried out on the image signal, which has been obtained from the aforesaid replacement. At this time, the continuous tone image signal in the image signal, which has been obtained from the replacement, is compressed irreversibly such that the original image cannot be restored completely. Also, the redundancy, which has been imparted to the binary image signal, is removed therefrom. Therefore, in the image signal, which has been obtained from the irreversible signal compression processing, the binary image signal is kept such that the original binary image can be restored completely. The image signal, which has thus been obtained from the irreversible signal compression processing, is then stored in the storage means. Accordingly, when the image signal is read from the storage means, the original binary image of, for example, handwritten characters can be restored completely from the image signal.

With the first image signal storing method and apparatus in accordance with the present invention, part of the continuous tone image signal is replaced by the binary image signal in the manner described above. Therefore, image filing apparatuses, which have heretofore been used, need not be renewed or modified. Also, information about handwritten characters, or the like, is not destroyed when the irreversible signal compression processing is carried out.

Therefore, after part of the continuous tone image signal is replaced by the binary image signal in the manner described above, the irreversible signal compression processing can be carried out without the presence of the binary image signal being taken into consideration. Accordingly, image filing apparatuses, which have heretofore been used, can be used directly in order to store both the continuous tone image signals and the information about handwritten characters, or the like.

The present invention further provides a second image signal storing method, which comprises the steps of:

i) obtaining a continuous tone image signal representing a continuous tone image, in which continuous tones are expressed, and a binary image signal representing a binary image, which carries information giving specifics about said continuous tone image, each of said continuous tone image signal and said binary image signal being made up of a series of image signal components, ii) replacing the image signal components of said continuous tone image signal, which correspond to part of the region in said continuous tone image, by the image signal components of said binary image signal, and iii) storing an image signal, which has been obtained from said replacement, wherein each of the image signal components of said continuous tone image signal, which correspond to picture elements located in said part of the region in said continuous tone image, by a plurality of the image signal components of said binary image signal, which correspond to a plurality of picture elements in said binary image.

The present invention still further provides a second image signal storing apparatus, which comprises:

i) a signal replacing means for: a) obtaining a continuous tone image signal representing a continuous tone image, in which continuous tones are expressed, and a binary image signal representing a binary image, which carries information giving specifics about said continuous tone image, each of said continuous tone image signal and said binary image signal being made up of a series of image signal components, and b) replacing the image signal components of said continuous tone image signal, which correspond to part of the region in said continuous tone image, by the image signal components of said binary image signal, ii) a storage means for storing a plurality of image signals, and iv) a signal writing means for writing an image signal, which has been obtained from said replacement, into said storage means, wherein said signal replacing means replaces each of the image signal components of said continuous tone image signal, which correspond to picture elements located in said part of the region in said continuous tone image, by a plurality of the image signal components of said binary image signal, which correspond to a plurality of picture elements in said binary image.

As described above, in most of medical images, or the like, all of different parts of each image are not equally important for a diagnosis of an illness, or the like. Usually, only the middle part of an image is important, and surrounding image parts, are not much important. Also, information about characters, or the like, need not be expressed with continuous tones, but may be expressed with white and black. The amount of a binary signal representing white and black is comparatively small.

Therefore, with the second image signal storing method and apparatus in accordance with the present invention, the image signal components of the continuous tone image signal, which correspond to part of the region in the continuous tone image, such as a medical image, are replaced by the image signal components of the binary image signal representing the binary image of characters, or the like.

However, if the image signal components of the continuous tone image signal, which correspond to part of the region in the continuous tone image, are merely replaced by the image signal components of the binary image signal, there will be the risk that a considerably large area of the continuous tone image is replaced by the binary image, and an important region in the continuous tone image is lost.

Therefore, in the second image signal storing method and apparatus in accordance with the present invention, such characteristics are utilized that the information about characters, or the like, can be represented by a binary signal representing white and black. Specifically, signal replacement is carried out such that each of the image signal components of the continuous tone image signal, which correspond to picture elements located in part of the region in the continuous tone image, may correspond to a plurality of the image signal components of the binary image signal, which correspond to a plurality of picture elements in the binary image. As a result, only a small part of the continuous tone image signal is replaced by the binary image signal. Therefore, only the image signal components of the continuous tone image signal, which correspond to an unimportant region in the continuous tone image, are lost, and no problem occurs when the continuous tone image is reproduced as a visible image and used in making a diagnosis of an illness, or the like.

Accordingly, with the second image signal storing method and apparatus in accordance with the present invention, image filing apparatuses, which have heretofore been used and are not particularly designed for storing binary image signals, can be used directly in order to store both the continuous tone image signals and the information about handwritten characters, or the like. Also, as described above, each of the image signal components of the continuous tone image signal, which correspond to picture elements located in part of the region in the continuous tone image, is replaced by a plurality of the image signal components of the binary image signal, which correspond to a plurality of picture elements in the binary image. Therefore, the amount of the information about the continuous tone image, which amount is lost, can be kept small.

BRIEF DESCRIPTION OF THE DRAWINGS

FIGS. 2A, 2B, and 2C are diagrams showing picture elements located at part of an image, which diagrams serve as an aid in explaining how signals are processed, FIG. 3 is a schematic view showing an example of an X-ray image recording apparatus, FIG. 4 is a perspective view showing an X-ray image read-out apparatus, an image processing unit, which constitutes an example of the signal replacing means in the embodiment of the first image signal storing apparatus in accordance with the present invention, and an image filing apparatus, which constitutes examples of the signal compression processing means and the signal writing means int he embodiment of the first image signal storing apparatus in accordance with the present invention, FIG. 6A is a diagram showing picture elements in an X-ray image, FIG. 6B is a diagram showing picture elements in a binary image, FIG. 6C is a diagram showing a series of bits, by which an image signal component A corresponding to a picture element A in the X-ray image shown in FIG. 6A is replaced.

DESCRIPTION OF THE PREFERRED EMBODIMENTS

Figure 1:
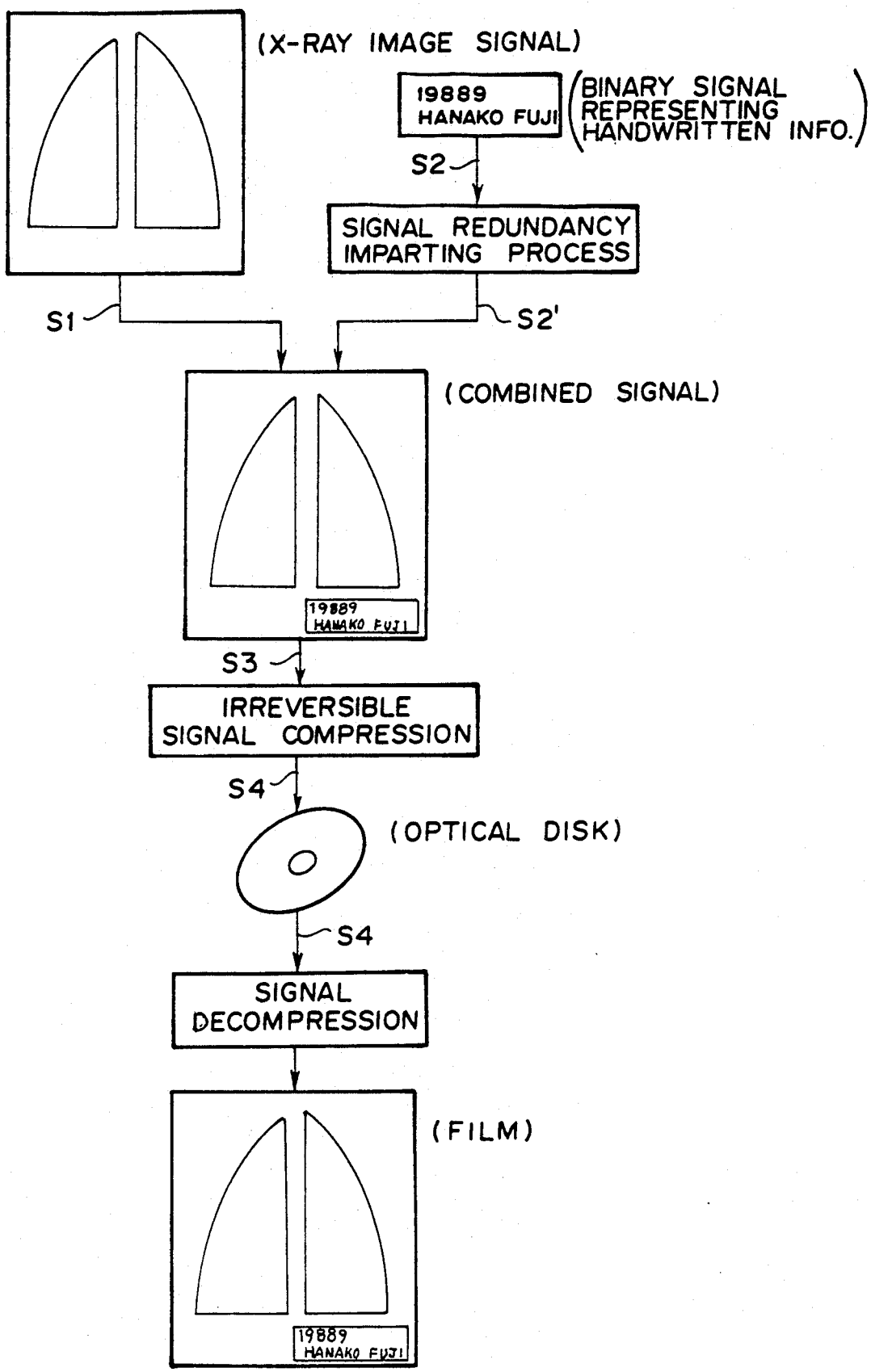
FIG. 1 is a flow diagram showing how signals are processed in an image processing unit and an image filing apparatus in an embodiment of the first image signal storing apparatus in accordance with the present invention.

The present invention will hereinbelow be described in further detail with reference to the accompanying drawings.

In the embodiments described below, stimulable phosphor sheets are used, and an X-ray image of a human body is stored on each stimulable phosphor sheet.

When certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

FIG. 3 is a schematic view showing an example of an X-ray image recording apparatus in a radiation image recording and reproducing system which utilizes stimulable phosphor sheets.

With reference to FIG. 3, X-rays 12 are produced by an X-ray source 11 of an X-ray image recording apparatus and irradiated to the chest 13a of a human body 13. X-rays 12a, which have passed through the human body 13, impinge upon a stimulable phosphor sheet 14. In this manner, an X-ray image of the chest 13a of the human body 13 is stored on the stimulable phosphor sheet 14.

FIG. 4 is a perspective view showing an X-ray image read-out apparatus, an image processing unit, which constitutes an example of the signal replacing means in an embodiment of the first image signal storing apparatus in accordance with the present invention, and an image filing apparatus, which constitutes examples of the signal compression processing means and the signal writing means in the embodiment of the first image signal storing apparatus in accordance with the present invention.

With reference to FIG. 4, a stimulable phosphor sheet 14, on which an X-ray image has been stored, is placed at a predetermined position in an X-ray image read-out apparatus 20. The stimulable phosphor sheet 14 is then conveyed in a sub-scanning direction indicated by the arrow Y by a sheet conveyance means (not shown). A laser beam 24, which serves as stimulating rays, is produced by a laser beam source 23, and is reflected and deflected by a rotating polygon mirror 26 which is quickly rotated by a motor 25 in the direction indicated by the arrow. The laser beam 24 then passes through a converging lens 27 constituted of an fθ lens or the like. The direction of the optical path of the laser beam 24 is then changed by a mirror 28, and the laser beam 24 impinges upon the stimulable phosphor sheet 14 and scans it in a main scanning direction indicated by the arrow X, which direction is approximately normal to the sub-scanning direction indicated by the arrow Y. When the stimulable phosphor sheet 14 is exposed to the laser beam 24, the exposed portion of the stimulable phosphor sheet 14 emits light 29 in an amount proportional to the amount of energy stored thereon during its exposure to the X-rays. The emitted light 29 is guided by a light guide member 30 and then photoelectrically detected by a photomultiplier 31. The light guide member 30 is made from a light guiding material such as an acrylic plate and has a linear light input face 30a, positioned so that it extends along the main scanning line on the stimulable phosphor sheet 14, and the ring-shaped light output face 30b, positioned so that it is in close contact with a light receiving face of the photomultiplier 31. The emitted light 29, which has entered the light guide member 30 at its light input face 30a, is guided through repeated total reflection inside of the light guide member 30, emanates from the light output face 30b, and is received by the photomultiplier 31. In this manner, the amount of the emitted light 29, which amount represents the X-ray image, is converted into an electric signal by the photomultiplier 31.

An analog output signal S0 generated by the photomultiplier 31 is logarithmically amplified by a logarithmic amplifier 32, and digitized by an A/D converter 33 into an electric image signal S1. The image signal S1 is made up of a series of image signal components representing picture elements in the X-ray image. Each of the image signal components is expressed with eight bits. Therefore, when the X-ray image is reproduced as a visible image from the image signal S1, the visible image has 256 levels of density resolution.

The image signal S1 is then fed into an image processing unit 40. The image processing unit 40 constitutes an example of the signal replacing means in an embodiment of the first image signal storing apparatus in accordance with the present invention. The image processing unit 40 comprises a main body 41 in which a CPU and an internal memory are incorporated a disk drive unit 42 which operates a floppy disk serving as a subsidiary memory, a keyboard 43 from which necessary instructions, or the like, are fed by the operator, and a CRT display device 44 which displays necessary information.

Also, before or after the X-ray image is read out from the stimulable phosphor sheet 14, in a handwritten information read-out apparatus 35, handwritten characters, or the like, which have been recorded on a card 37, are read out by a charge coupled device (CCD) 36. A signal thus obtained is converted into a binary signal and digitized by a binary signal generator 38. In this manner, a digital binary signal S2 is generated, which represents the handwritten information recorded on the card 37. The binary signal S2 is also fed into the image processing unit 40.

The image processing unit 40 combines the image signal S1 and the binary signal S2 in the manner described below and thereby generates a combined signal S3. The combined signal S3 is then fed into an image filing apparatus 50.

FIG. 1 is a flow diagram showing how signals are processed in an image processing unit and an image filing apparatus in an embodiment of the first image signal storing apparatus in accordance with the present invention. FIGS. 2A, 2B, and 2C are diagrams showing picture elements located at part of an image, which diagrams serve as an aid in explaining how signals are processed.

As illustrated in FIG. 2A, the image signal S1, which represents the X-ray image and has been fed into the image processing unit 40, is made up of a series of image signal components $X_{ij}$, where $i, j = 1, 2, \ldots$, which represent a plurality of picture elements $X_{ij}$, where $i, j = 1, 2, \ldots$, in the X-ray image. In FIGS. 2A, 2B, and 2C, as an aid in facilitating the explanation, the same reference characters are used to denote both the picture elements and the image signal components representing the picture elements. The image signal S1 is made up of a series of very many image signal components representing very many picture elements $X_{ij}$, where $i, j = 1, 2, \ldots$ Therefore, as shown in FIG. 2A, a calculation is made to find the mean value of values of the image signal components $X_{ij}$, which represent four adjacent picture elements (i.e. $2 \times 2$ picture elements in the array of picture elements). The calculation is carried out for every group of four adjacent picture elements in the array of picture elements. The mean value thus calculated is employed as the value of a new image signal component, which is representative of the four image signal components $X_{ij}$ representing the four adjacent picture elements. In this manner, the number of the image signal components $X_{ij}$ is decreased to one fourth. Before the number of the image signal components $X_{ij}$, where $i, j = 1, 2, \ldots$, of the image signal S1 is thus decreased, as illustrated in FIG. 1, some of the image signal components $X_{ij}$ representing the picture elements, which are located at part of an unimportant region in the X-ray image, are replaced by the binary signal S2 in the manner described below. The combined signal S3 is thus generated by combining the image signal S1 and the binary signal S2.

The binary signal S2 represents the information about the handwritten characters, or the like, in terms of two values. In the binary signal S2, one bit is assigned to each image signal component representing each of the picture elements in the binary image of the handwritten characters, or the like. On the other hand, as described above, in the image signal S1, eight bits are assigned to each image signal component representing each of the picture elements $X_{ij}$, where $i, j = 1, 2, \ldots$ Therefore, before part of the image signal S1 is replaced by the binary signal S2, the binary signal S2 is processed such that a plurality of image signal components of the binary signal S2, which represent a plurality of picture elements in the binary image, may correspond to a single image signal component of the image signal S1, which represent a single picture element in the X-ray image.

In this embodiment, the binary signal S2 is processed by considering irreversible signal compression processing, which will be described later. Specifically, such that seven image signal components of the binary signal S2, which represent seven picture elements in the binary image, may correspond to a single image signal component of the image signal S1, which represents a single picture element in the X-ray image, each of seven image signal components of the binary signal S2, which represent seven picture elements in the binary image and are "1" or "0", is assigned to each of seven high-order bits of eight bits. Also, "0" is always assigned to the least significant bit of the eight bits.

In the manner described above, seven image signal components of the binary signal S2, which represent seven picture elements in the binary image, are assigned to eight bits, which are to be assigned to each of the image signal components $X_{ij}$, where $i, j = 1, 2, \ldots$, of the image signal S1. In this manner, image signal components a, b, c, ... are obtained, each of which is composed of eight bits. Thereafter, as illustrated in FIG. 2B, the same signal components a, a, a, a are assigned to a group of four adjacent picture elements in the X-ray image. In the same manner, the same signal components b, b, b, b, the same image signal components c, c, c, c, and so on, are assigned to other groups of four adjacent picture elements in the X-ray image. In this manner, part of the image signal S1 is replaced by the binary signal S2, which has been processed in the manner described above. Several groups of four image signal components of the image signal S1, which represent several groups of four adjacent picture elements in the X-ray image, are thus replaced by the same signal components a, a, a, a, the same signal components b, b, b, b, the same image signal components c, c, c, c, and so on. Therefore, when an averaging process is carried out on the groups of four image signal components, the image signal components a, b, c, ... remain as mean image signal components.

In this embodiment, as described above, during the processing of the binary signal S2, each of seven image signal components of the binary signal S2 is assigned to each of seven high-order bits of eight bits, and "0" is always assigned to the least significant bit of the eight bits. Also, the same image signal components are assigned to each group of four adjacent picture elements in the X-ray image. Such processing constitutes an example of redundancy imparting process in accordance with signal compression processing, which redundancy imparting process is carried out in the first image signal storing apparatus in accordance with the present invention.

In the manner described above, part of the image signal S1 is replaced by the binary signal S2, and the combined signal S3 is thereby obtained. The combined signal S3 is fed into the image filing apparatus 50.

In the image filing apparatus 50, signal compression processing is carried out in the manner described below regardless of whether the received signal is the image signal S1 or is the combined signal S3, in which part of the image signal S1 has been replaced by the binary signal S2.

In the image filing apparatus 50, a calculation is carried out on the combined signal S3 to find the mean value of values of the image signal components, which represent four adjacent picture elements. The calculation is carried out for every group of four adjacent picture elements in the array of picture elements. The mean value thus calculated is employed as the value of a new image signal component, which is representative of the four image signal components representing the four adjacent picture elements. In this manner, the number of the image signal components is decreased to one fourth. Specifically, as indicated by the hatching in FIG. 2A, groups of four adjacent picture elements, which are located along two adjacent rows in the array of picture elements, are shifted horizontally by a distance equal to the length of a single picture element from the groups of four adjacent picture elements, which are located along the next two adjacent rows in the array of picture elements. The averaging process is carried out on the image signal components corresponding to every such group of four adjacent picture elements. For example, the mean value of the values of the image signal components, which represent four adjacent picture elements located at the top left-hand corner of the array of picture elements, is calculated with the formula $$x11 = (X11 + X12 + X21 + X22)/4 \quad (1)$$

A new image signal component x11 representing the mean value x11 is thereby generated. As for the image signal components representing the picture elements located on the third and fourth rows, the image signal components representing two picture elements X31 and X41 located at the tops of the third and fourth rows are ignored. A calculation is made with, for example, the formula $$b11 = (X32 + X33 + X42 + X43)/4 \quad (2)$$

A new image signal component b11 representing the mean value b11 is thereby generated.

As for the part of the combined signal S3, at which the binary signal S2 is employed in lieu of the image signal S1, a calculation is carried out with, for example, the formula $$a = (a + a + a + a)/4 \quad (3)$$

In this manner, the image signal components a, b, c, ... are generated. Each of the image signal components, which have thus been generated by calculated with Formulas (1), (2), and (3), is composed of eight bits.

In the manner described above, the averaging process is carried out on the image signal components corresponding to the whole area of the image, which is obtained by replacing part of the image signal S1 by the binary signal S2. (As an aid in facilitating the explanation, the image obtained from the replacement will also be referred to as the X-ray image.) Thereafter, in each of the image signal components, the eight bits are shifted by one bit to the low order side, and the information set at the least significant bit is thereby erased. As a result of the averaging process and the bit shifting, the amount of the signal is decreased irreversibly. However, as described above, during the processing of the binary signal S2, each of seven image signal components of the binary signal S2 was assigned to each of seven high-order bits of eight bits, and "0" was always assigned to the least significant bit of the eight bits. Therefore, when the averaging process and the bit shifting are carried out, the amount of the binary signal S2 does not decrease.

FIG. 2C shows the picture elements xij, aij, bij, and cij, where i, j = 1, 2, ..., in the X-ray image, which are represented by the image signal components xij, aij, bij, and cij, where i, j = 1, 2, ..., obtained from the aforesaid processing.

After the irreversible signal compression processing has been carried out in the manner described above, signal compression processing is carried out by utilizing an interpolation encoding process. When the interpolation encoding process is carried out, the amount of the signal is decreased even further. However, in this embodiment, the interpolation encoding process is carried out as reversible signal compression processing. Therefore, the binary signal S2 is ultimately kept unlost.

In this embodiment, the interpolation encoding process is carried out in the manner described below. Specifically, in FIG. 2C, the image signal components representing the picture elements arrayed along the odd-numbered rows are sampled alternately. The image signal components xij, where i, j = 1, 2, ..., which have thus been sampled, are employed as main image signal components. Also, in the manner described below, interpolated image signal components are generated from the image signal components representing the remaining picture elements aij, bij, and cij, where i, j = 1, 2, ..

Specifically, interpolated values (predicted values) aij', bij', and cij', where i, j = 1, 2, ..., which correspond to the image signal components aij, bij, and cij, where i, j = 1, 2, ..., are calculated from the values of the main image signal components xij, where i, j = 1, 2, ... The calculations are carried out with the formulas $$aij' = (xij + xi,j+1)/2 \quad (4)$$

$$bij' = (3 \cdot xij + xi,j+1 + 3 \cdot xi+1,j + xi+1,j+1)/8 \quad (5)$$

$$cij' = (xij + 3 \cdot xi,j+1 + xi+1,j + 3 \cdot xi+1,j+1)/8 \quad (6)$$

Thereafter, calculations are made to find the values of differences between the interpolated values aij', bij', and cij', where i, j=1, 2, ..., and the actual values of the corresponding image signal components aij, bij, and cij, where i, j=1, 2, ... In this manner, difference image signal components Δaij, Δbij, and Δcij, where i, j=1, 2, ..., are generated which represent the values of the differences thus calculated. The calculations are carried out with the formulas $$\Delta aij = aij - aij' \tag{7}$$

$$\Delta bij = bij - bij' \tag{8}$$

$$\Delta cij = cij - cij' \tag{9}$$

The values of the difference image signal components Δaij, Δbij, and Δcij, where i, j=1, 2, ..., are transformed into Huffman codes in accordance with, for example, a Huffman code table shown in Table 1. With the Huffman code table shown in Table 1, a value closer to zero is transformed into a shorter code. In many cases, the interpolated values aij', bij', and cij', where i, j=1, 2, ..., which have been calculated from the values of the main image signal components xij, where i, j=1, 2, ..., with Formulas (4), (5), and (6), and the actual values of the corresponding image signal components aij, bij, and cij, where j=1, 2, ... are close to each other. Therefore, by calculating the values of the differences between the interpolated values aij', bij', and cij', where i, j=1, 2, ..., and the actual values of the corresponding image signal components aij, bij, and cij, where i, j=1, 2, ..., in the manner described above and transforming the values of the differences into the Huffman codes, short codes can be assigned as a whole, and the amount of the signal can be reduced even further.

TABLE 1

| Dif. Value | Code |
| --- | --- |
| 10 | *001000100 |
| 9 | *001000010 |
| 8 | *00100011 |
| 7 | *0010011 |
| 6 | *0000011 |
| 5 | *000111 |
| 4 | *00101 |
| 3 | *00001 |
| 2 | *011 |
| 1 | *111 |
| 0 | *10 |
| −1 | *110 |
| −2 | *010 |
| −3 | *0011 |
| −4 | *00010 |
| −5 | *000110 |
| −6 | *0000010 |
| −7 | *0010010 |
| −8 | *00100000 |
| −9 | *001000011 |
| −10 | *001000101 |
| Others | *0000001 |

As for the main image signal components xij, where i, j=1, 2, ..., which correspond to each group of two rows in the array of picture elements shown in FIG. 2C, a calculation is made to find the value of the difference between the value of the image signal component xi,j+1 representing each picture element and the value of the image signal component xi,j representing the picture element, which is located immediately before each said picture element. The calculations are carried out with Formula (10)

$$\Delta xi,j+1 = xi,j+1 - xij \tag{10}$$

In this manner, difference image signal components Δxi,j+1, where i, j=1, 2, ..., are generated, which represent the values of the differences thus calculated. The values of the difference image signal components Δxi,j+1, where i, j=1, 2, ..., are encoded into Huffman codes. In general, neighboring picture elements in an image have strong correlation to one another. Therefore, in many cases, the values of the difference image signal components Δxi,j+1, where i, j=1, 2, ..., which have been calculated from Formula (10), are close to zero. Accordingly, by encoding the values of the difference image signal components Δxi,j+1, where i, j=1, 2, ..., into the Huffman codes, the amount of the signal can be reduced. In this manner, as for the main image signal components xij, where i, j=1, 2, ..., a series of the main image signal components corresponding to each group are generated, which are constituted of the main image signal component xi,1, located at the top of each group, and the difference image signal components Δxi,j+1, where i, j=1, 2, ..., which have been encoded into the Huffman codes and correspond to the next and following main image signal components xi,j+1, where i, j=1, 2, ...

In the manner described above, a compressed image signal S4 is obtained by combining the image signal S1 and the binary signal S2 with each other into the combined signal S3, and compressing the combined signal S3. The compressed image signal S4 is then stored on an optical disk, which has been inserted into the image filing apparatus 50.

In cases where a visible image is to be reproduced from a compressed image signal S4, which has been stored on the optical disk, a desired image is designated at the keyboard 43, and the compressed image signal S4 corresponding to the designated image is read from the optical disk. In the image filing apparatus 50, signal decompression processing, which corresponds to the reversed operation of the aforesaid signal compression processing, is carried out on the compressed image signal S4. A signal, which has been obtained from the signal decompression processing, is then fed into the image processing unit 40. The image processing unit 40 carries out signal transformation processing such that each image signal component of the binary signal S2 representing a single picture element may correspond to each image signal component representing a single picture element in the X-ray image. Thereafter, a signal, which has been obtained from the signal transformation processing, is fed into an image reproducing apparatus (not shown). In the image reproducing apparatus, a visible image comprising the X-ray image and patterns of handwritten characters, or the like, which have been inserted into part of the X-ray image, is reproduced on a sheet of film from the signal.

In the visible image recorded on the film, the image quality at areas other than the patterns of the handwritten characters, or the like, becomes slightly poor due to the aforesaid irreversible signal compression processing. However, the information about the handwritten characters, or the like, can be reproduced appropriately.

As described above, in the image processing unit 40, the redundancy imparting process is carried out on the binary signal S2, and the binary signal S2, which has been imparted with redundancy, is combined with the image signal S1. The combined signal S3 is then fed into the image filing apparatus 50. Therefore, in the image filing apparatus 50, the same irreversible signal compression processing can be carried out regardless of whether part of the image signal S1 has been or has not been replaced by the binary signal S2. Also, by virtue of the redundancy imparting process, the binary signal S2 can be prevented from being lost.

Embodiments of the second image signal storing apparatus in accordance with the present invention will be described hereinbelow.

In an embodiment of the second image signal storing apparatus in accordance with the present invention, an image signal S1 and a binary signal S2 are obtained in the same manner as that described above with reference to FIG. 4. An example of the signal replacing means of the second image signal storing apparatus in accordance with the present invention is constituted by the image processing unit 40 shown in FIG. 4. Examples of the storage means and the signal writing means of the second image signal storing apparatus in accordance with the present invention are constituted by the image filing apparatus 50 shown in FIG. 4.

In this embodiment, in the image processing unit 40, the image signal S1 and the binary signal S2 are combined with each other in the manner described below, and a combined signal S3 is thereby obtained. The combined signal S3 is fed into the image filing apparatus 50.

Figure 5:
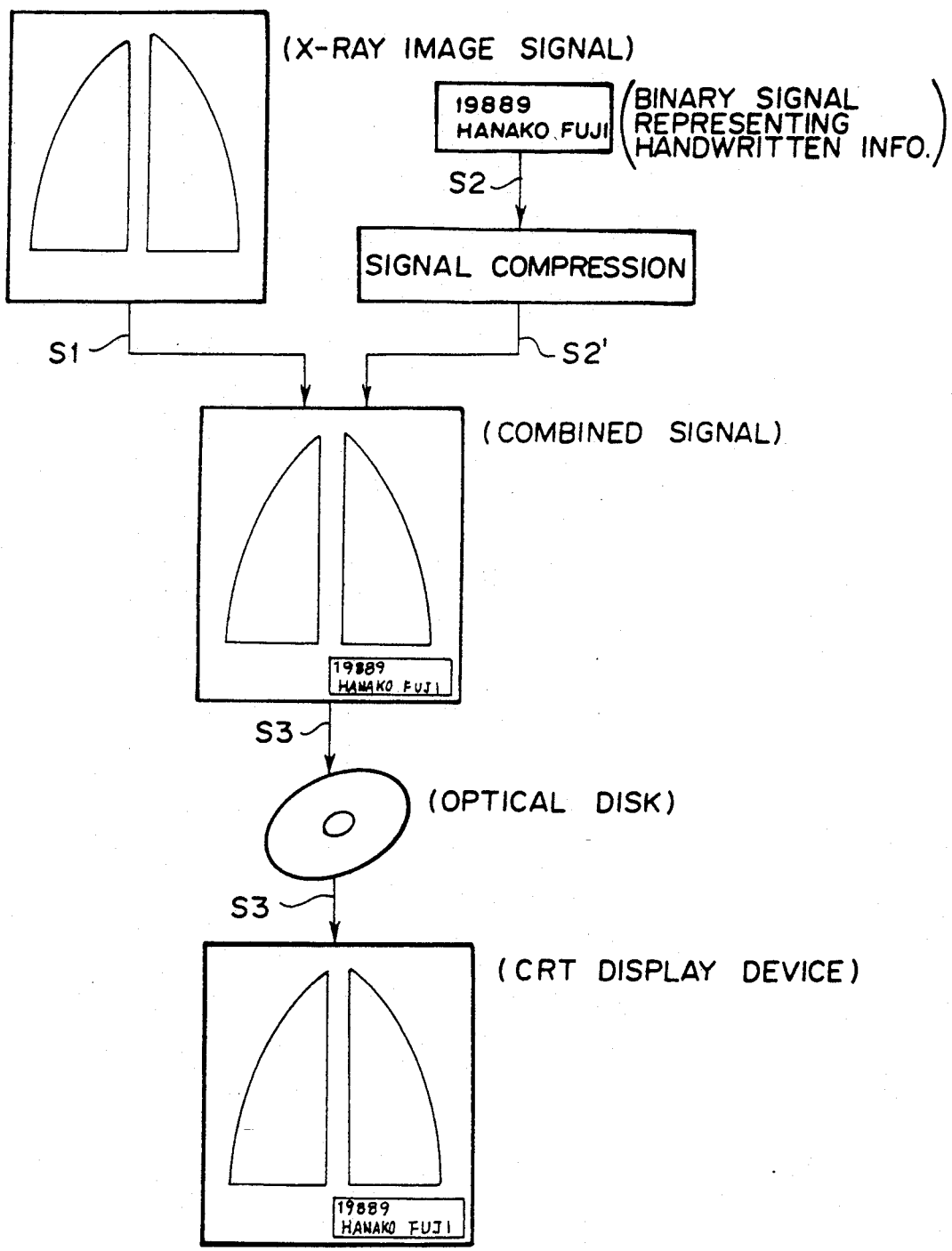
FIG. 5 is a flow diagram showing how signals are processed in an image processing unit and an image filing apparatus in an embodiment of the second image signal storing apparatus in accordance with the present invention.
Figures 6A, 6B, 6C:
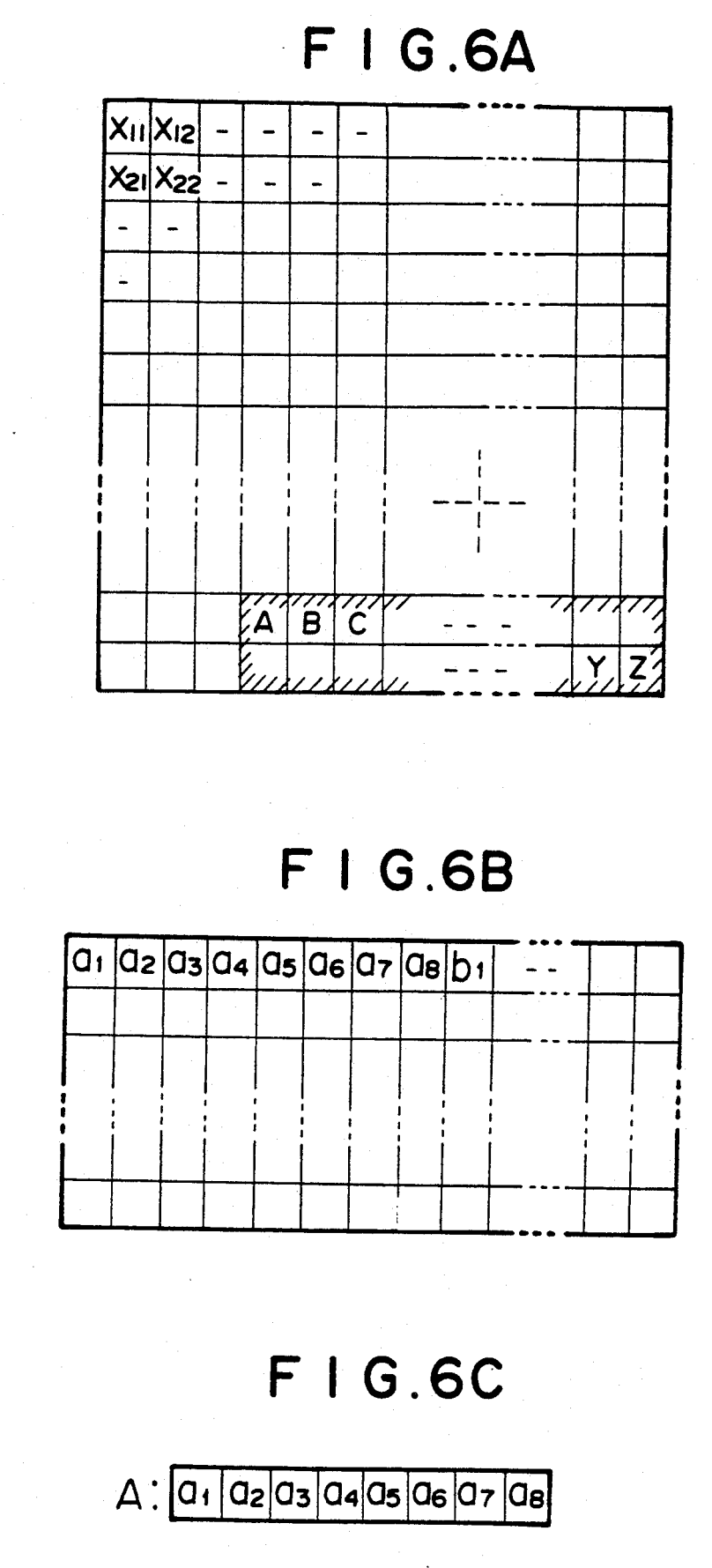

FIG. 5 is a flow diagram showing how signals are processed in an image processing unit and an image filing apparatus in an embodiment of the second image signal storing apparatus in accordance with the present invention. FIG. 6A is a diagram showing picture elements in an X-ray image, which diagram serves as an aid in explaining how signals are processed.

As illustrated in FIG. 6A, the image signal S1, which represents the X-ray image and has been fed into the image processing unit 40, is made up of a series of image signal components $X_{ij}$, where $i, j = 1, 2, \ldots$, which represent a plurality of picture elements $X_{ij}$, where $i, j = 1, 2, \ldots$, in the X-ray image. In FIG. 6A, as an aid in facilitating the explanation, the same reference characters are used to denote both the picture elements and the image signal components representing the picture elements.

In the image processing unit 40, as illustrated in FIG. 5, some of the image signal components $X_{ij}$, where $i, j = 1, 2, \ldots$, representing the picture elements, which are located at part of an unimportant region in the X-ray image, (in this embodiment, the picture elements A, B, C, ..., Y, and Z shown in FIG. 6A) are replaced by the binary signal S2 in the manner described below. The combined signal S3 is thus generated by combining the image signal S1 and the binary signal S2.

The binary signal S2 represents the information about the handwritten characters, or the like, in terms of two values. In the binary signal S2, one bit is assigned to each image signal component representing each of the picture elements in the binary image of the handwritten characters, or the like. On the other hand, as described above, in the image signal S1, eight bits are assigned to each image signal component representing each of the picture elements $X_{ij}$, where $i, j = 1, 2, \ldots$. Therefore, before part of the image signal S1 is replaced by the binary signal S2, the binary signal S2 is processed such that eight image signal components of the binary signal S2, which represent eight picture elements in the binary image, may correspond to a single image signal component of the image signal S1, which represent a single picture element in the X-ray image.

FIG. 6B is a diagram showing picture elements in a binary image. FIG. 6C is a diagram showing a series of bits, by which an image signal component A corresponding to a picture element A in the X-ray image shown in FIG. 6A is replaced.

By way of example, signal compression processing is carried out such that eight image signal components of the binary signal S2, which represent eight picture elements in the binary image, may correspond to a single image signal component of the image signal S1, which represent a single picture element in the X-ray image, e.g. such that eight image signal components, a1 through a8, of the binary signal S2, which represent eight picture elements, a1 through a8, in the binary image, may correspond to the image signal component A of the image signal S1, which represent the picture element A in the X-ray image. A compressed binary signal S2' is thereby obtained from the signal compression processing. Thereafter, the image signal components, A through Z, of the image signal S1 are replaced by the compressed binary signal S2'. In this manner, signal replacement is carried out such that a plurality of image signal components of the binary signal S2, which represent a plurality of picture elements in the binary image, may correspond to a single image signal component of the image signal S1, which represent a single picture element in the X-ray image. Therefore, the information about the binary image can be stored with only the information representing a few picture elements in the X-ray image being lost.

The combined signal S3, which has been obtained by combining the image signal S1 and the compressed binary signal S2' in the manner described above, is fed into the image filing apparatus 50. In the image filing apparatus 50, when necessary, signal compression processing is carried out on the combined signal S3, and the combined signal S3 is then stored on an optical disk.

In cases where a visible image is to be reproduced from an image signal S3, which has been stored on the optical disk, a desired image is designated at the keyboard 43, and the image signal S3 corresponding to the designated image is read from the optical disk. In cases where the image signal S3 was subjected to the signal compression processing, in the image filing apparatus 50, signal decompression processing, which corresponds to the reversed operation of the signal compression processing, is carried out on the image signal S3. A signal, which has been obtained from the signal decompression processing, is then fed into the image processing unit 40.

In the image processing unit 40, the combined signal S3 is separated into the image signal S1 representing the X-ray image and the compressed binary signal S2' corresponding to the binary image of handwritten characters, or the like. Signal decompression processing is carried out on the compressed binary signal S2', and the binary signal S2 is thereby generated. The image signal S1 and the binary signal S2 are then fed into the CRT display device 44. On the CRT display device 44, visible images of the X-ray image and the handwritten characters, or the like, are displayed independently. Alternatively, as shown in FIG. 5, the visible images are displayed together. As described above, part of the image signal S1 is lost. Therefore, when the visible image of the X-ray image alone is displayed on the CRT display device 44 an image whose part is lost is displayed. However, because the binary signal S2 was compressed and then combined with the image signal S1, only a very small part of the X-ray image is lost.

No limitation is imposed on how the binary signal S2 is compressed. For example, the binary signal S2 may be compressed in the manner described below.

Figures 7A, 7B:
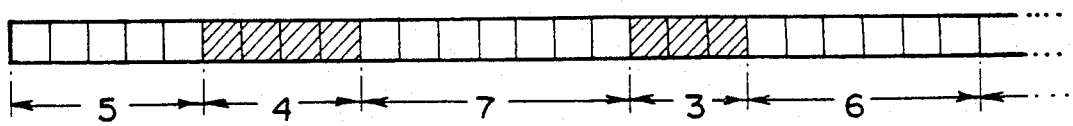
FIG. 7A is a diagram showing a row of picture elements in a binary image.
FIG. 7B is a diagram showing codes representing signal components of a binary signal, by which codes the image signal components of an image signal corresponding to part of picture elements in the X-ray image shown in FIG. 6A are replaced.

FIG. 7A is a diagram showing a row of picture elements in a binary image. FIG. 7B is a diagram showing codes representing signal components of a binary signal, by which codes the image signal components of an image signal corresponding to part (i.e. picture elements A, B, C, . . . ) of picture elements in the X-ray image shown in FIG. 6A are replaced.

As for binary images of handwritten characters, or the like, there is a strong probability that, when a certain picture element is white, the next adjacent picture element is also white. Also, there is a strong probability that, when a certain picture element is black, the next adjacent picture element is also black. Therefore, in this example, such properties of binary images are utilized. Specifically, a run length encoding process is employed, wherein the lengths of runs of white picture elements and black picture elements are encoded sequentially. In FIG. 7A, run lengths of 5, 4, 7, 3, . . . are encoded. As illustrated in FIG. 7B, the run length codes and codes representing white (0) and black (1) are employed in lieu of the image signal components of the image signal S1 representing the picture elements A, B, C, . . . in the X-ray image. In this manner, signal replacement can be carried out such that a plurality of image signal components of the binary signal S2, which represent a plurality of picture elements in the binary image, may correspond to a single image signal component of the image signal S1, which represent a single picture element in the X-ray image.

Any of various known processes may be employed to replace each image signal component of the image signal S1, which represent a single picture element in the X-ray image, by a plurality of image signal components of the binary signal S2, which represent a plurality of picture elements in the binary image.

In the aforesaid embodiments of the first and second image signal storing apparatuses in accordance with the present invention, X-ray images are processed. The first and second image signal storing apparatuses in accordance with the present invention are also applicable when other types of images are processed.

We claim:

1. An image signal storing method, comprising the steps of:
    i) obtaining a continuous tone image signal representing a continuous tone image, in which continuous tones are expressed, and a binary image signal representing a binary image, which carries information giving specifics about said continuous tone image,
    ii) replacing a part of said continuous tone image signal by said binary image signal,
    iii) performing a redundancy imparting process on said binary image signal such that image signal components of said binary image signal which are assigned to replace a designated image signal component of said continuous tone image signal are also assigned to replace an additional predetermined number of image signal components of said continuous tone image signal to prevent information represented by said binary image signal from being reduced when an irreversible signal compression processing is carried out,
    iv) carrying out said irreversible signal compression processing on an image signal obtained after replacing said part of said continuous tone image signal with said binary image signal,
    v) storing an image signal, which has been obtained from said irreversible signal compression processing, and
    vi) thereafter replacing said part of said continuous tone image signal by the binary image signal, which has been obtained from said redundancy imparting process.

2. The method as defined in claim 1 wherein said continuous tone image is a medical image.

3. The method as defined in claim 1 wherein said continuous tone image is a radiation image.

4. The method as defined in claim 3 wherein said radiation image is stored on a stimulable phosphor sheet.

5. An image signal storing apparatus, comprising:
    i) a signal replacing means for:
        a) obtaining a continuous tone image signal representing a continuous tone image, in which continuous tones are expressed, and a binary image signal representing a binary image, which carries information giving specifics about said continuous tone image, and for
        b) replacing a part of said continuous tone image signal by said binary image signal,
    ii) a signal compression processing means for carrying out irreversible signal compression processing on an image signal, which has been obtained from said replacement,
    iii) a redundancy imparting means for performing a redundancy imparting process on said binary image signal such that image signal components of said binary image signal which are assigned to replace a designated image signal component of said continuous tone image are also assigned to replace an additional predetermined number of image signal components of said continuous tone image to prevent the information represented by said binary image signal from being reduced when said irreversible signal compression processing is carried out, and
    iv) a storage means for storing a plurality of image signals obtained from said irreversible signal compression processing,
    v) wherein said signal replacing means replaces said part of said continuous tone image signal, which part corresponds to said part of said continuous tone image, by the binary image signal which has been obtained from said redundancy imparting process.

6. The apparatus as defined in claim 5 wherein said continuous tone image is a medical image.

7. The apparatus as defined in claim 5 wherein said continuous tone image is a radiation image.

8. The apparatus as defined in claim 7 wherein said radiation image is stored on a stimulable phosphor sheet.

9. An image signal storing method, comprising the steps of:
    i) obtaining a continuous tone image signal representing a continuous tone image, in which continuous tones are expressed, and a binary image signal representing a binary image, which carries information giving specifics about said continuous tone image, each of said continuous tone image signal and said binary image signal being made up of a series of image signal components, ii) replacing the image signal components of said continuous tone image signal by the image signal components of said binary image signal, and iii) storing an image signal, which has been obtained from said replacement, iv) wherein each of the image signal components of said continuous tone image signal, which correspond to picture elements located in said part of said continuous tone image, are replaced by a plurality of the image signal components of said binary signal which correspond to a plurality of picture elements in said binary image.

10. The method as defined in claim 9 wherein said continuous tone image is a medical image.

11. The method as defined in claim 9 wherein said continuous tone image is a radiation image.

12. The method as defined in claim 11 wherein said radiation image is stored on a stimulable phosphor sheet.

13. An image signal storing apparatus, comprising:
 i) a signal replacing means for;
  a) obtaining a continuous tone image signal representing a continuous tone image, in which continuous tones are expressed, and a binary image signal representing a binary image, which carries information giving specifics about said continuous tone image, each of said continuous tone image signal and said binary image signal being made up of a series of image signal components, and for
  b) replacing the image signal components of said continuous tone image signal by the image signal components of said binary image signal, and
 ii) a storage means for storing a plurality of image signals obtained after replacing said image signal components of said part of said continuous tone image signal with said image signal components of said binary image signal,
 iii) wherein said signal replacing means replaces each of the image signal components of said continuous tone image signal, which correspond to picture elements located in said part of said continuous tone image, by a plurality of the image signal components of said binary image signal which correspond to a plurality of picture elements in said binary image.

14. The apparatus as defined in claim 13 wherein said continuous tone image is a medical image.

15. The apparatus as defined in claim 13 wherein said continuous tone image is a radiation image.

16. The apparatus as defined in claim 15 wherein said radiation image is stored on a stimulable phosphor sheet.

* * * * *